United States Patent

Draaisma et al.

[11] Patent Number: 5,911,455
[45] Date of Patent: Jun. 15, 1999

[54] METHOD OF MANUFACTURING A THIN-FILM MAGNETIC HEAD

[75] Inventors: Eeltje A. Draaisma; Hendrik A. J. Neerhof, both of Eindhoven, Netherlands

[73] Assignee: U.S. Philips Corporation, New York, N.Y.

[21] Appl. No.: 08/768,483

[22] Filed: Dec. 18, 1996

[30] Foreign Application Priority Data

Dec. 27, 1995 [EP] European Pat. Off. .............. 95203640

[51] Int. Cl.⁶ .............................. G11B 5/42; B24B 49/10
[52] U.S. Cl. .................................. 29/603.07; 29/603.09; 29/603.16; 360/113; 451/5; 451/8
[58] Field of Search ................. 29/593, 603.01, 29/603.07, 603.09, 603.1, 603.16; 451/5, 8, 9, 11; 360/113, 122, 125–127

[56] References Cited

U.S. PATENT DOCUMENTS

| | | |
|---|---|---|
| 3,787,638 | 1/1974 | Murai . |
| 4,155,106 | 5/1979 | Muraoka et al. . |
| 4,511,942 | 4/1985 | Valstyn .................................. 451/28 X |
| 4,841,625 | 6/1989 | Valstyn .................................. 451/1 X |
| 4,912,883 | 4/1990 | Chang et al. ............................... 451/1 |
| 5,065,483 | 11/1991 | Zammit .................................. 451/1 X |
| 5,132,617 | 7/1992 | Leach et al. ............................. 451/8 X |
| 5,214,589 | 5/1993 | Tang ...................................... 451/1 X |
| 5,361,547 | 11/1994 | Church et al. .............................. 451/5 |
| 5,386,666 | 2/1995 | Cole ........................................ 451/5 |
| 5,597,340 | 1/1997 | Church et al. .............................. 451/5 |

FOREIGN PATENT DOCUMENTS

0361778 A1 4/1990 European Pat. Off. .

Primary Examiner—Timothy V. Eley
Attorney, Agent, or Firm—Gray, Cary, Ware & Freidenrich, LLP; Terrance A. Meador; David F. Kleinsmith

[57] ABSTRACT

Method of manufacturing a magnetic head, in which a multilayer structure comprising a transducing system (11A) with electrically conducting connecting tracks (17a, 17b) and further comprising a head face sensor system (15a, 15b) with electrically conducting connecting tracks (17a, 17b; 19a, 19b) is formed on a substrate. A processing operation is performed for forming a head face (23), which operation is terminated on the basis of measurements performed on the head face sensor system. In order to obtain a simple pattern of connecting tracks which can easily be realized, a portion of one of the connecting tracks of the transducing system (11A) and a portion of one of the connecting tracks of the head face sensor system (15a, 15b) are formed as a common connecting track (17a), and a portion of a further one of the connecting tracks of the transducing system and at least a portion of a further one of the connecting tracks of the head face sensor system (15a, 15b) are formed as a further common connecting track (17b).

9 Claims, 6 Drawing Sheets

METHOD OF MANUFACTURING A THIN-FILM MAGNETIC HEAD

BACKGROUND OF THE INVENTION

The invention relates to a method of manufacturing a magnetic head, in which a multilayer structure comprising a transducing system with electrically conducting connecting tracks and further comprising a head face sensor system with electrically conducting connecting tracks is formed on a substrate, and in which a processing operation is performed for forming a head face, which processing operation is terminated on the basis of measurements performed on the head face sensor system.

Such a method is known from EP-A 0 361 778. In accordance with the known method, a series of thin-film transducing elements each provided with a magnetoresistive element with a collect guide and a return guide are formed on a substrate. Simultaneously with the formation of the transducing elements, electric lapping guides (ELGs) are deposited at the end of the series of transducing elements. Similarly as the collect and return guides of the magnetoresistive elements, the ELGs are connected to a multiplexer. During the formation of a head face, the resistance of the ELGs is first measured for controlling a rough lapping process, and subsequently the resistance of the individual magnetoresistive elements is measured so as to control a fine lapping process for determining the ultimate height of the magnetoresistive elements. In the known magnetic head thus obtained, the magnetoresistive elements therefore adjoin the head face. Such magnetic heads belong to the sensor-in-gap-head type, referred to as SIG heads. The known method is not suitable for manufacturing magnetic heads in which the magnetoresistive element does not adjoin the head face but forms part of a magnetic yoke. These heads are referred to as YMR heads. Another considerable drawback of the known method is that many electric conductors are required for establishing the desired measuring connections, which gives rise to intricate conductor patterns which are difficult to realize from a technological point of view because of the limited available space in thin-film magnetic heads.

OBJECTS AND SUMMARY OF THE INVENTION

It is an object of the invention to provide a method of the type described in the opening paragraph in which both SIG heads and YMR heads can be manufactured and in which the head face sensor system has a simple pattern of connecting tracks which can easily be realized.

The method according to the invention is characterized in that at least a portion of one of the connecting tracks of the transducing system and at least a portion of one of the connecting tracks of the head face sensor system are formed as a common connecting track. In the method according to the invention, connecting tracks or portions thereof of the head face sensor system are integrated with connecting tracks or portions thereof of the transducing system, so that a simple pattern of connecting tracks is possible which can be easily provided from a technological point of view. Due to the measure used, the number of required connection faces for establishing the necessary external connections may remain limited. Both the simple pattern of connecting tracks and the limited number of connection faces are favourable factors for maintaining small dimensions of a magnetic head, particularly the portion obtained from a wafer. In a practical embodiment, at least a portion of a further one of the connecting tracks of the transducing system and at least a portion of a further one of the connecting tracks of the head face sensor system are formed as a further common connecting track. The method according to the invention is applicable to the manufacture of SIG heads as well as YMR heads in which the same arrangement for performing resistance measurements on the head face sensor system can be used.

An embodiment of the method according to the invention is characterized in that a head face sensor system with head face sensors is formed as a head face sensor system, in which at least a transducing element of the transducing system is formed between two head face sensors, the common connecting track being connected to one of the two head face sensors and the further common connecting track being connected to the other one of the two head face sensors. In this way, one saves at least two, or at least substantially two connecting tracks. Moreover, one saves at least two connection faces.

An embodiment of the method according to the invention is characterized in that connecting tracks not associated with the common connecting track and the further common connecting track of the head face sensor system are substantially implemented as a common electric conductor. The measure used in this embodiment provides ample possibilities for realizing suitable patterns of connecting tracks and offers great freedom in the creation of suitable lay-outs. An additional, but important advantage is that the use of the common conductor leads to a lower electric resistance of at least a partial system of connecting tracks. The common conductor may be implemented as an electrically conducting layer of the multilayer structure. The multilayer structure may be provided on a conducting or non-conducting substrate by deposition by means of known deposition methods such as vapour deposition or sputtering of material having a satisfactory electrical conductivity. Suitable materials are, for example, metals such as copper, gold or electrically conducting metallic alloys such as NiFe. In principle, the conducting layer does not need to be structured.

An embodiment of the method according to the invention is characterized in that the substrate is formed from an electrically conducting material and is connected as a common electric conductor to the multilayer structure. In this embodiment, the common conductor is realized in an extremely simple manner. Suitable electrically conducting materials from which the substrate may be formed are, for example, electrically conducting ceramic materials such as $Al_2O_3/TiC$, MnZn ferrite, or a semiconductor material such as doped silicon.

An embodiment of the method according to the invention is characterized in that the head face sensors are incorporated in a circuit for performing a resistance measurement. Such a measurement is used in the method according to the invention for obtaining information about the position, and possibly the slope, viewed from one to the other head face sensor, of the at least partly formed head face during the formation of this head face, for example by means of grinding and/or lapping and/or polishing, so as to be able to control the machining operations for forming the head face at any desired moment or in a continuing process.

An embodiment of the method according to the invention is characterized in that, after the formation of the head face, the head face sensor system is electrically decoupled from the common connecting track and the further common connecting track. A possible unwanted load of the transducing system during use of the magnetic head is thereby prevented. In this connection, a practical embodiment is characterized in that the head face sensor system is interrupted by blowing a fuse by way of applying an electric load, which fuse is arranged in series with the common connecting track, and a further fuse arranged in series with the further common connecting track of the head face sensor system. The fuses may be integrated in the head face sensor system and constituted by a sensor.

The invention also relates to a magnetic head manufactured by means of the method according to the invention. The magnetic head according to the invention is provided with a transducing system, in which at least two connecting tracks, or parts thereof, of a pattern of connecting tracks of the transducing system are integrated with at least two connecting tracks, or parts thereof, of a pattern of connecting tracks of a head face sensor system. Dependent on the use or implementation of the magnetic head, the head face sensor system may be present fully intact in the magnetic head or may only be partly present.

These and other aspects of the invention will be apparent from and elucidated with reference to the embodiments described hereinafter.

DESCRIPTION OF THE PREFERRED EMBODIMENTS

Figure 1:
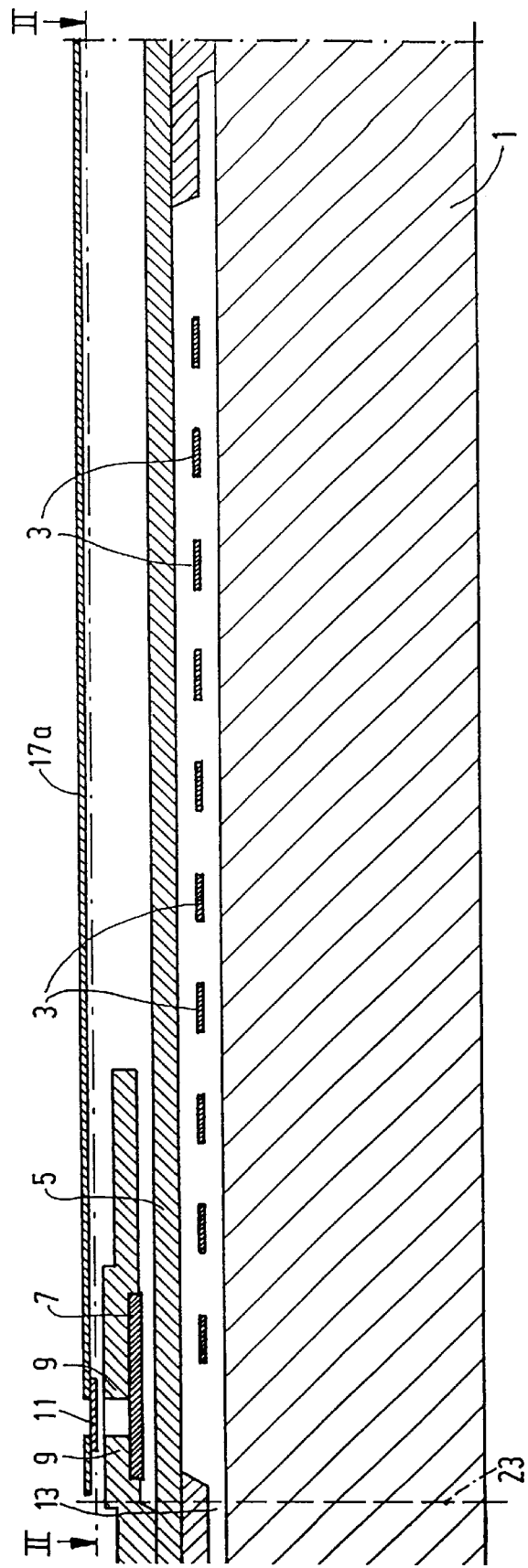
FIG. 1 is a diagrammatic cross-section of a magnetic head structure comprising a substrate with a layer structure from which a first embodiment of the magnetic head according to the invention is formed.
Figure 2:
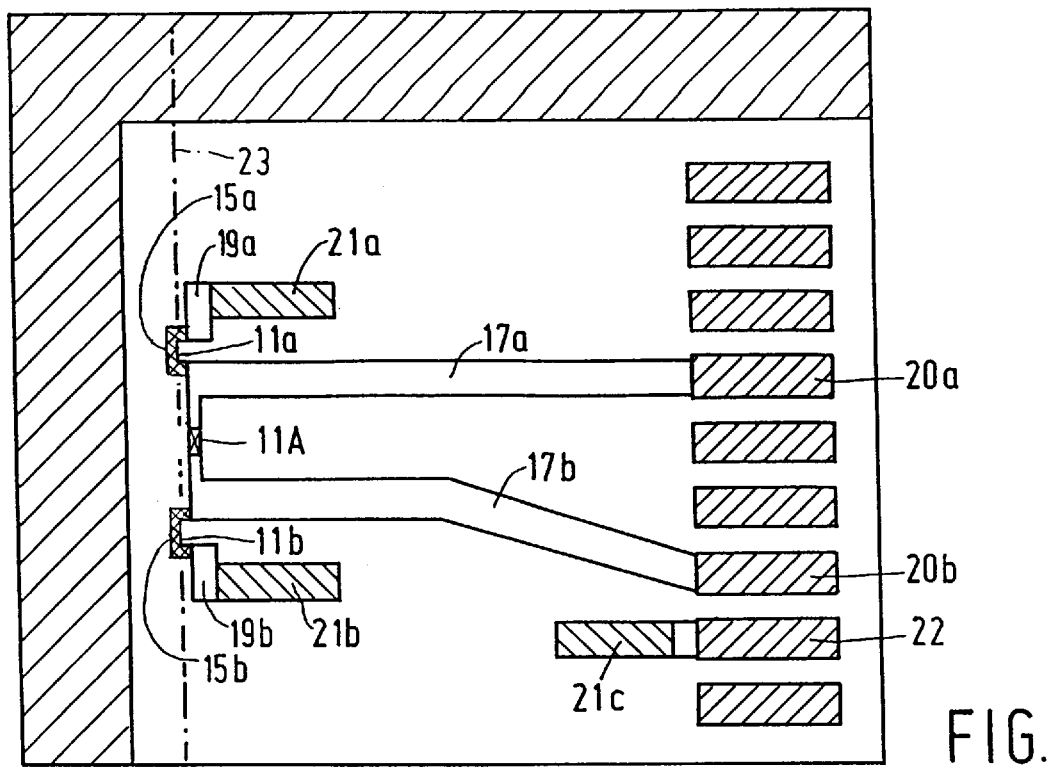
FIG. 2 shows diagrammatically the magnetic head structure of FIG. 1, taken on the line II—II.

FIGS. 1 and 2 show magnetic head structures according to the invention comprising, in this embodiment, a soft-magnetic, electrically conducting substrate 1 of, for example, MnZn ferrite provided with a multilayer structure, particularly a thin-film structure. In this embodiment, the multilayer structure is provided with a structured electrically conducting layer 3 of, for example, copper, a soft-magnetic layer 5 of, for example, an NiFe alloy, an electrically conducting layer 7 of, for example, gold, a structured soft-magnetic layer 9 of, for example, NiFe alloy, and a magnetoresistive layer 11 of, for example, NiFe alloy. The multilayer structure is also provided with an insulation layer 13 of, for example, $SiO_2$ or $Al_2O_3$ with which the structure adjoins the substrate, as well as similar insulation layers between the layers 3, 5, 7, 9 and 11. A magnetic head according to the invention, provided with a transducing system, is formed from the magnetic head structure which may be considered as a hybrid product. In this embodiment, the transducing system comprises an inductive transducing element which is formed from the electrically conducting layer 3, and a magnetoresistive element 11A which is formed from the magnetoresistive layer 11 which may be provided with a known structure of equipotential strips. A test and/or bias winding is formed from the electrically conducting layer 7.

The multilayer structure shown comprises a head face sensor system which, in this embodiment, is provided with two head face sensors 15a and 15b formed from electrically conducting layer portions 11a and 11b of, for example, gold which are formed simultaneously with the magnetoresistive layer 11 during manufacture. During manufacture of the magnetic head, electrically conducting connecting tracks for the transducing system and the head face sensor system are provided in the multilayer structure. The multilayer structure comprises, inter alia, the connecting track 17a and further connecting tracks 17b, which are electrically connected to the magnetoresistive layer 11 and terminate in the connection face 20a and the further connection face 20b, respectively. The connecting tracks 17a and 17b are also electrically connected to the layer portions 15a and 15b, respectively, so that the connecting tracks 17a and 17b constitute common connecting tracks for the magnetoresistive element 11A, on the one hand, and the head face sensors 15a and 15b, on the other hand. Moreover, connecting tracks 19a and 19b are electrically connected to the head face sensors 15a and 15b, which tracks are connected, in this embodiment, via through-connections 21a and 21b to a common conductor, for example, the electrically conducting substrate 1 which terminates in a connection face 22 via a through-connection 21c. The multilayer structure may be protected by a counter block of, for example, $Al_2O_3/TiC$.

Figure 4:
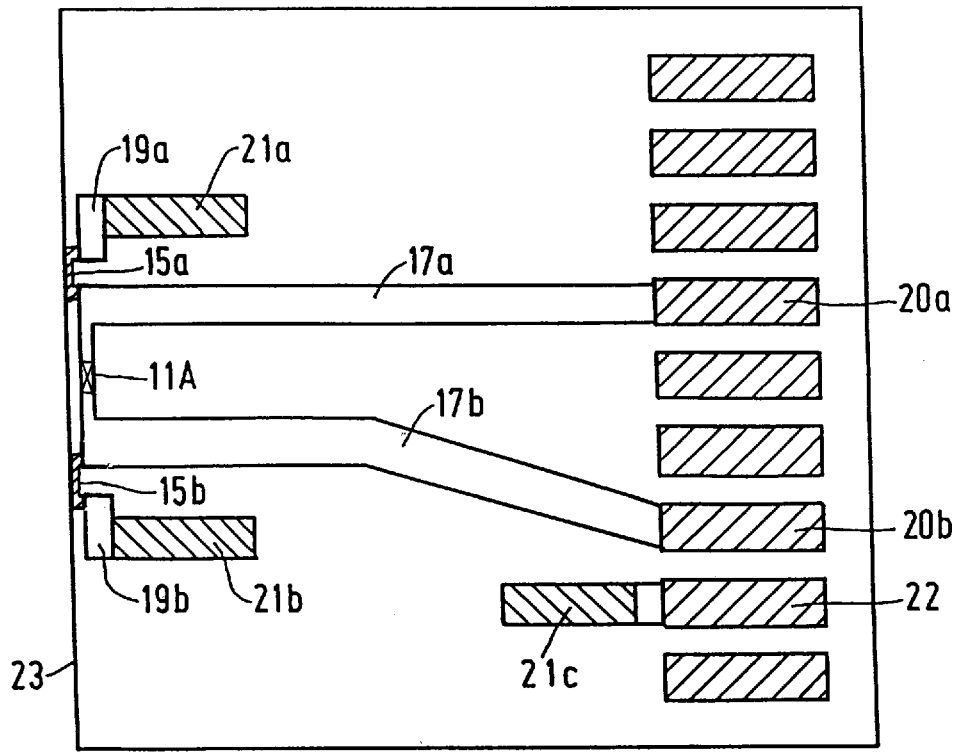
FIG. 4 shows diagrammatically the magnetic head of FIG. 3, taken on the line IV—IV.
Figure 3:
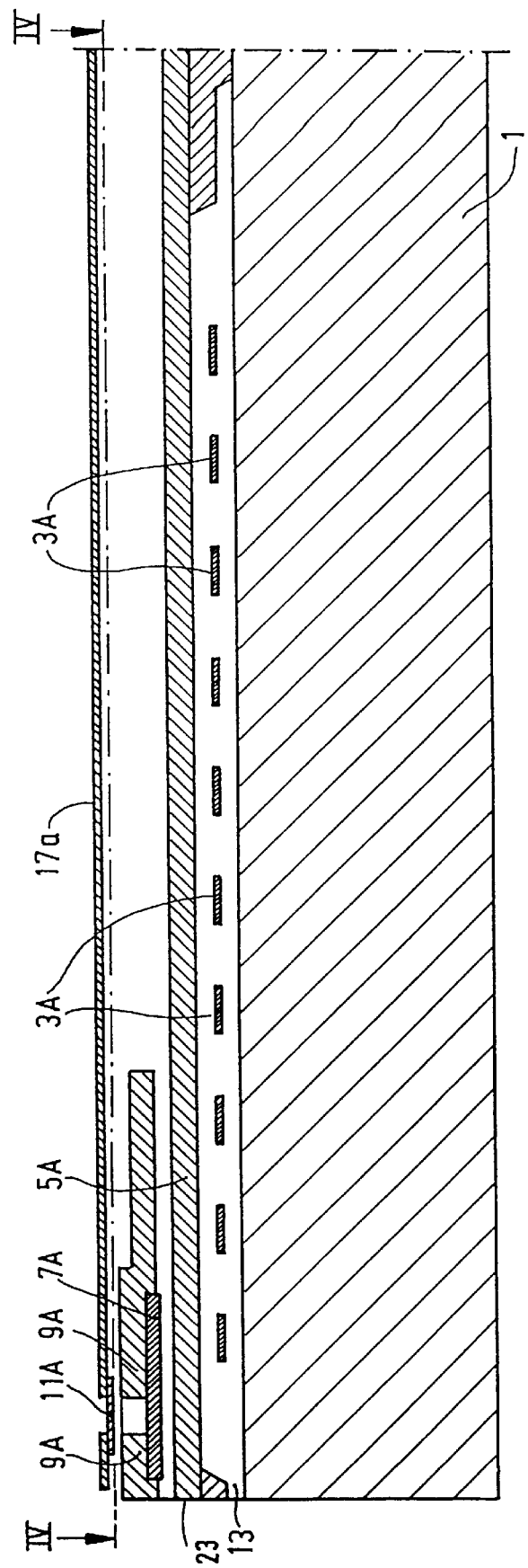
FIG. 3 is a diagrammatic cross-section of the first embodiment of the magnetic head according to the invention.

The magnetic head according to the invention, shown in FIGS. 3 and 4, is obtained from the magnetic head structure shown in FIGS. 1 and 2. To this end, a processing operation, for example, grinding and/or polishing and/or lapping is performed on the magnetic head structure so as to form a head face 23. In order to determine the correct location and direction of the head face to be formed, use is made of the head face sensors 15a and 15b extending originally beyond the head face to be formed and being provided in the magnetic head structure, which head face sensors are present at both sides of the magnetoresistive element 11A, while resistance values of the sensors 15a and 15b are determined by measurement during the formation of the head face 23. Based on the obtained instantaneous resistance values, the processing operation can be controlled in order that the predefined head face is obtained accurately. For the sake of completeness, it is to be noted that the shown magnetic head according to the invention comprises a flux guide 5A formed from the magnetic layer 5 and an interrupted flux guide 9A formed from the magnetic layer 9. The magnetic head also has a write winding 3A formed from the electrically conducting layer 3 and a bias and/or test winding 7A formed from the layer 7.

The magnetic head structure shown in FIGS. 1 and 2 and the magnetic head shown in FIGS. 3 and 4 may not be provided with a soft-magnetic substrate but with an assembly of a non-magnetic substrate of, for example, $Al_2O_3/TiC$ and a magnetic layer of, for example, NiFe alloy.

Figure 5:
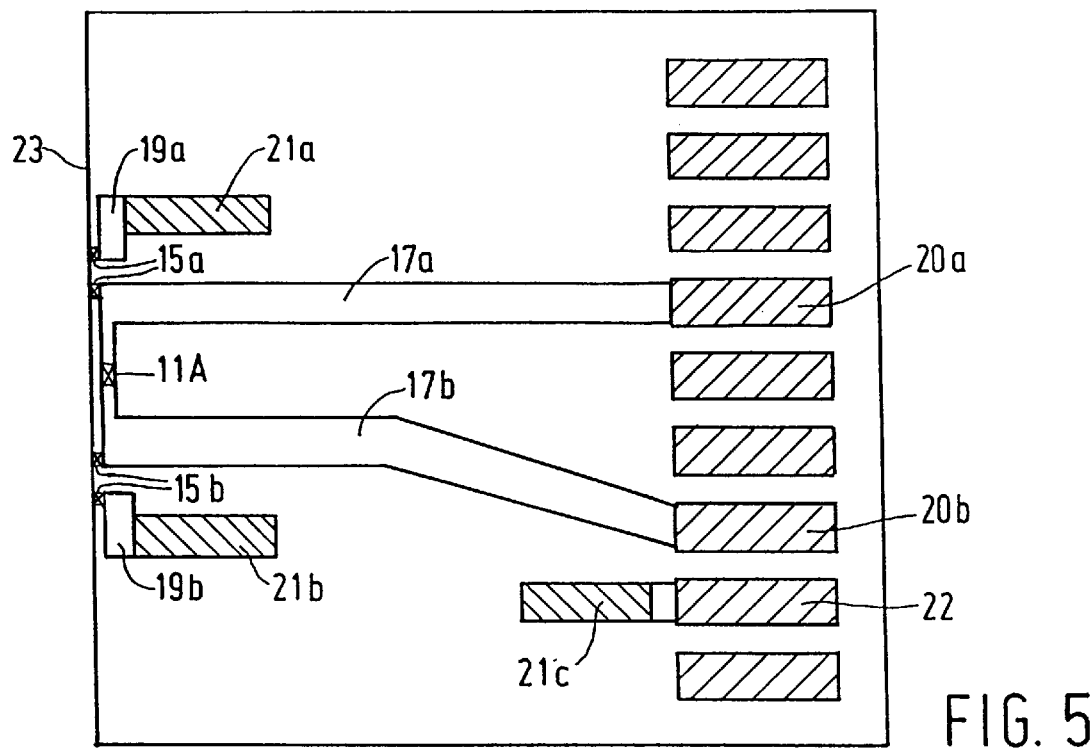
FIG. 5, is a cross-section of the first embodiment of the magnetic head according to the invention.

The magnetic head according to the invention, shown in FIG. 5, is formed from a magnetic head structure of a type shown in FIGS. 1 and 2. With respect to the magnetic head shown in FIGS. 3 and 4, the magnetic head shown in FIG. 5 has interrupted head face sensors 15a and 15b. Such sensors are obtained by electrically loading the head face sensors to such a heavy extent that they melt locally. The sensors thus function as fuses. It is also possible to provide separate fuses in series with the head face sensors.

For the sake of clarity, it is to be noted that the parts of the magnetic head visible in FIG. 5 are denoted by the same reference numerals as the corresponding parts of the magnetic head shown in FIGS. 3 and 4.

Figure 6:
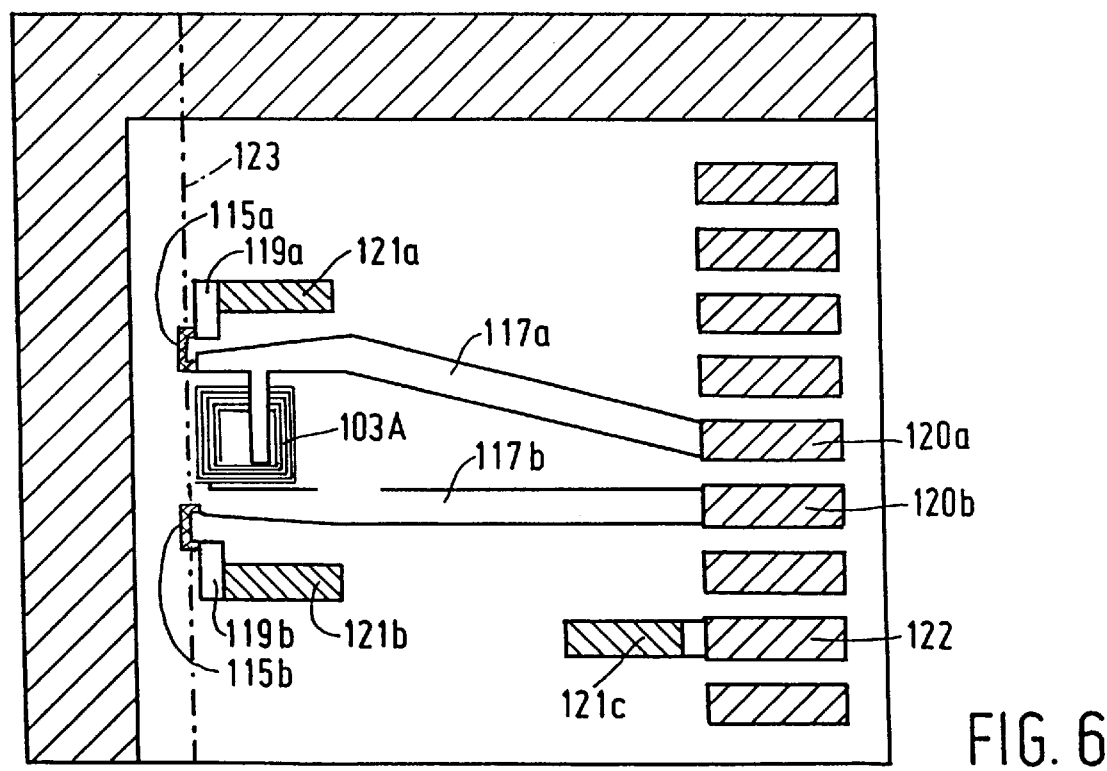
FIG. 6 is a cross-section of a magnetic head structure from which a third embodiment of the magnetic head according to the invention is formed.

The magnetic head structure according to the invention, shown in FIG. 6, comprises a write winding 103A and a head face sensor system with two head face sensors 119a and 119b which extend in an area formed by a head face 123 to be formed. Via common connecting tracks 117a and 117b, an end portion of the write winding 107A and an end portion of the sensor 119a are electrically connected to a connection face 120a, while the other end portion of the write winding 107A and an end portion of the sensor 119b are electrically connected to a connection face 120b. The other end portions of the sensors 115a and 115b are electrically connected to connecting tracks 119a and 119b, respectively. The connecting tracks 119a and 119b blend via through-connections 121a and 121b, respectively, with a common conductor constituted, for example, by a structured or non-structured electrically conducting layer of the magnetic head structure. The common conductor is electrically connected to a connection face 122 via a through-connection 121c. The head face may be formed by means of a mechanical processing operation, which is ended on the basis of measurements performed on the head face sensor system.

Figure 7:
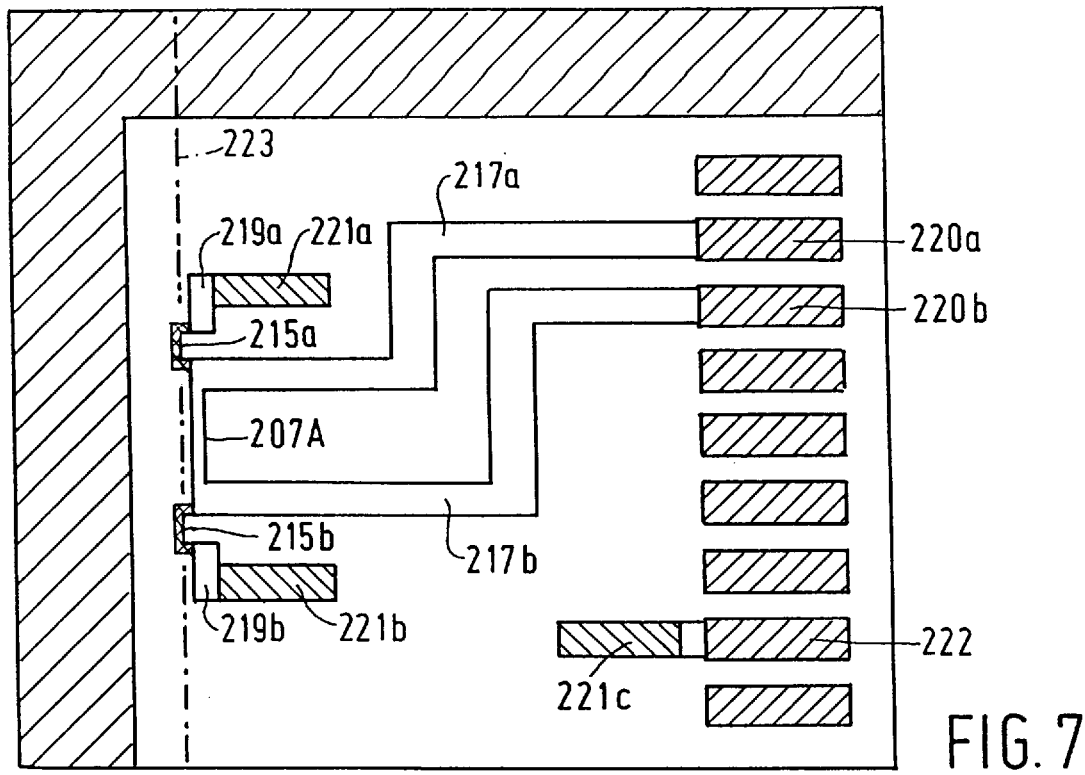
FIG. 7 is a cross-section of a magnetic head structure from which a fourth embodiment of the magnetic head according to the invention is formed.

The magnetic head structure shown in FIG. 7 comprises a bias and/or test winding 207A which is electrically connected to connection faces 220a and 220b by means of the connecting tracks 217a and 217b. The magnetic head structure is also provided with a head face sensor system with two head face sensors 215a and 215b situated in the plane of the winding 207A. These sensors, which extend beyond the head face 223 to be formed, are electrically arranged between the connecting track 217a and a connecting track 219a, and between the connecting track 217b and a connecting track 219b, respectively. The connecting tracks 219a and 219b may be connected to a connection face 222 via through-connections 221a and 221b, a common conductor present in a different plane and a through-connection 212c. By means of measurements, particularly resistance measurements on the sensors 215a and 215b, the progress of the process of forming the head face 233 can be monitored during manufacture of the magnetic head structure. A magnetic head having an accurately defined head face is thereby obtainable.

Figure 8:
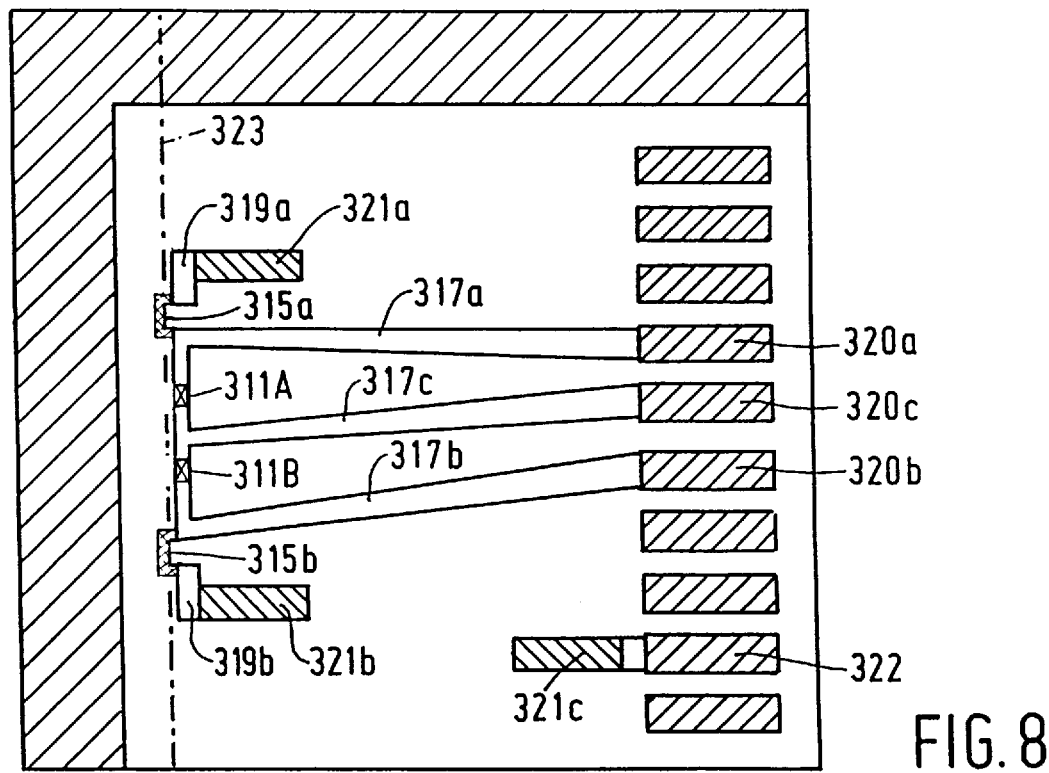
FIG. 8 is a cross-section of a magnetic head structure from which a fifth embodiment of the magnetic head according to the invention is formed.

The magnetic head structure according to the invention, shown in FIG. 8, corresponds to a structure as shown in FIGS. 1 and 2. A difference is the number of transducing elements of the transducing system. In this embodiment, the transducing system has two magnetoresistive elements 311A and 311B. A larger number is of course alternatively possible. The resistive elements are connected to connection faces 320a, 320b and 320c by means of connecting tracks 317a, 317b and 317c, respectively, the connecting track 317c functioning as the common connecting track for both magnetoresistive elements 311A and 311B. A head face sensor 315a, 315b is present at both sides of the set of magnetoresistive elements. During a mechanical processing operation performed on the structure, the sensors 315a and 315b provide information about the location and direction of the head face which is being produced, on the basis of which the mechanical processing operation for forming the head face 232 may be terminated. The head face sensors 315a and 315b are situated in the plane of the magnetoresistive elements 311A and 311B and are electrically arranged between the connecting track 317a and a connecting track 319a, and between the connecting track 317b and a connecting track 319b, respectively. The connecting tracks 319a and 319b blend with a common conductor, possibly via through-connections 321a and 321b, which conductor terminates in, or is electrically connected to, a common connection face 322, possibly via a through-connection 321c.

Figure 9:
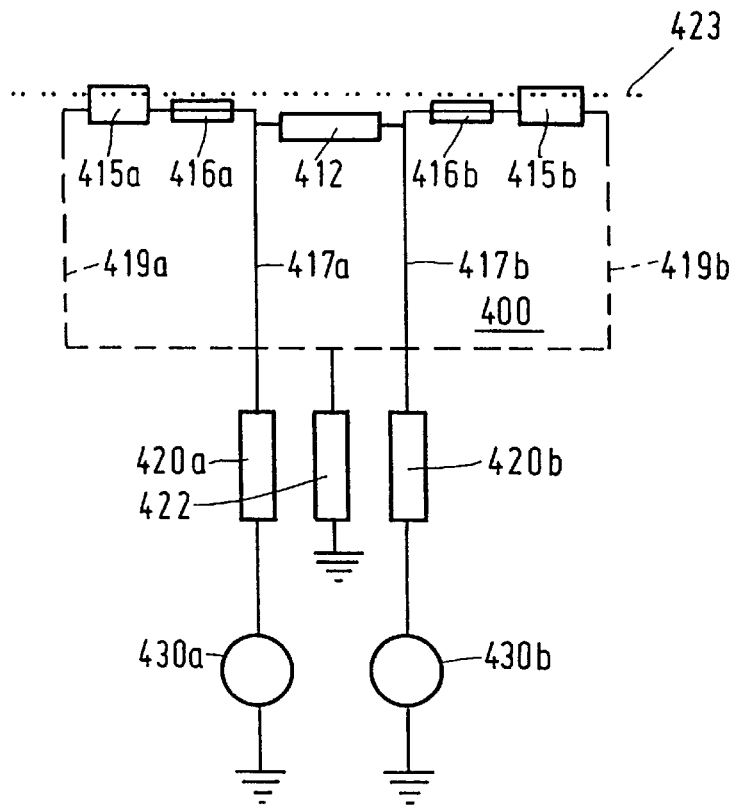
FIG. 9 shows a first embodiment of a circuit comprising head face sensors for performing a resistance measurement.

FIG. 9 shows a circuit according to the invention, which may be used for performing the method according to the invention. The magnetic head to be manufactured according to the invention is only shown diagrammatically and denoted by the reference numeral 400. The magnetic head 400 has a head face 423 and comprises a transducing system 412 having, for example one or more magnetoresistive elements and/or one or more inductive elements. The magnetic head structure, from which the magnetic head 400 is formed, is provided with a head face sensor system which comprises, for example, at both sides of the transducing system 412, a head face sensor 415a, 415b and a fuse 416a, 416b, respectively. The transducing system 412 shares a common connecting track 417a with the sensor 415a and shares a further common connecting track 417b with the sensor 415b. The connecting tracks 417a and 417b terminate in the connection faces 420a and 420b, respectively. The sensors 415a and 416b are connected to a common connection face 422 via an at least partially common electric conductor 419a/419b. Known measuring devices 430a and 430b for determining resistances are connected to the connection faces 420a and 420b, respectively, while the connection face 422 is connected to ground. In this way, the resistance across the head face sensors 415a and 415b can be separately determined for obtaining information about the location as well as the direction of the head face which is being formed. After the formation of the head face 423, the head face sensors 415a and 415b may be decoupled from the connecting tracks 417a and 417b by applying an electric overload to the fuses 416a and 416b, respectively.

Figure 10:
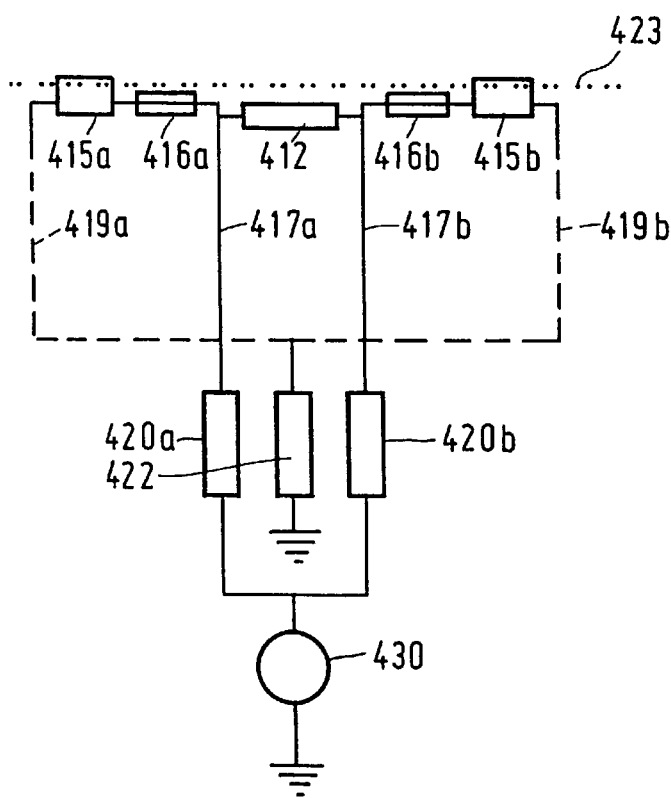
FIG. 10 shows a seconde embodiment of the circuit comprising the head face sensors.

FIG. 10 shows a circuit for the parallel determination of the resistances. In as far as FIG. 10 corresponds to FIG. 9, the same reference numerals are used. A measuring device 430 for determining resistances is connected to the connection faces 420a and 420b, while the connection face 422 is connected to ground. The parallel resistance across the head face sensors 415a and 415b can be determined by means of the device 430, so as to obtain information about the head face 423 which is being formed.

It is to be noted that the invention is not limited to the embodiments shown. For example, the method according to the invention may alternatively be used for manufacturing various types of magnetic heads such as read heads, write heads or combinations of read and write heads, in which one or more transducing elements and one or more head face sensors are present.

We claim:

1. A method of manufacturing a magnetic head comprising: forming a multilayer structure on a substrate, a common surface of said substrate and said multilayer structure forming a head face, said multilayer structure comprising a transducing system with electrically conducting connecting tracks and a head sensor system with electrically conducting connecting tracks for measuring electric resistance of said common surface and treating said common surface in a manner so as to adjust said electric resistance to a desired value and form a head face having a desired resistance, characterized in that at least a portion of one of the connecting tracks of the transducing system and a portion of one of the connecting tracks of the head face sensor system form a common connecting track.

2. A method as claimed in claim 1 characterized in that, after the formation of the head face, the head face sensor system is electrically decoupled from the common connecting track and the further common connecting track.

3. A method of claim 1 wherein an additional connecting track of the transducing system and an additional connecting track of the head face sensor system form an additional common connecting track.

4. A method of claim 3 characterized in that the head face sensor system comprises at least two head face sensors, at least a transducing element of the transducing system is formed between two of said head face sensors, one of the common connecting tracks is a connecting track of one of said two head face sensors and the other of the two common connecting tracks is a common connecting track of the other of the two head face sensors.

5. A method of claim 3 characterized in that remaining connecting tracks not associated with the common connecting track and the additional common connecting track are connected to a common electric conductor.

6. A method of claim 5 characterized in that the substrate is formed of an electrically conducting material and forms said common electric conductor.

7. A method of claim 5, characterized in that the head face sensor system is incorporated in a resistance measuring circuit.

8. A method as claimed in claim 3, characterized in that, after formation of the head face, the head face sensor system is electrically decoupled from the common connecting track and the additional common connecting track.

9. A method as claimed in claim 8, characterized in that a fuse is connected in series with the common connecting track, an additional fuse is arranged in series with the additional common connecting track and the head face sensor system is interrupted by applying an electric load sufficient to blow the fuse arranged in series with the common connecting track.

* * * * *